United States Patent
Kim et al.

(10) Patent No.: US 8,640,478 B2
(45) Date of Patent: Feb. 4, 2014

(54) NACELLE COOLING SYSTEM FOR WIND TURBINE

(75) Inventors: Hyun Tae Kim, Daejeon (KR); Jong Po Park, Masan-si (KR); Jin Hyung Lee, Seoul (KR); Jeong Il Kim, Daejeon (KR); Byung Kyu Lee, Seoul (KR)

(73) Assignee: Doosan Heavy Industries & Construction Co., Ltd., Changwon-Si (KR)

( * ) Notice: Subject to any disclaimer, the term of this patent is extended or adjusted under 35 U.S.C. 154(b) by 188 days.

(21) Appl. No.: 13/061,699

(22) PCT Filed: Sep. 1, 2009

(86) PCT No.: PCT/KR2009/004910
§ 371 (c)(1),
(2), (4) Date: May 31, 2011

(87) PCT Pub. No.: WO2010/024650
PCT Pub. Date: Mar. 4, 2010

(65) Prior Publication Data
US 2011/0221204 A1    Sep. 15, 2011

(30) Foreign Application Priority Data
Sep. 1, 2008    (KR) .................. 10-2008-0086032

(51) Int. Cl.
*F25D 23/12*    (2006.01)
(52) U.S. Cl.
USPC .......................................... 62/259.1; 290/55
(58) Field of Classification Search
USPC ......................................................... 290/55
See application file for complete search history.

(56) References Cited

U.S. PATENT DOCUMENTS

| | | | |
|---|---|---|---|
| 6,676,122 B1 | 1/2004 | Wobben | |
| 7,057,305 B2 * | 6/2006 | Kruger-Gotzmann et al. | . 290/55 |
| 7,111,668 B2 * | 9/2006 | Rurup | 165/134.1 |
| 7,168,251 B1 | 1/2007 | Janssen | 60/641.1 |
| 7,427,814 B2 * | 9/2008 | Bagepalli et al. | 290/55 |
| 7,905,104 B2 * | 3/2011 | Matesanz Gil et al. | 62/259.1 |
| 7,967,550 B2 * | 6/2011 | Grevsen et al. | 415/1 |

(Continued)

FOREIGN PATENT DOCUMENTS

| CN | 86 2 03729 U | 7/1987 |
|---|---|---|
| CN | 1666020 A | 9/2005 |

(Continued)

OTHER PUBLICATIONS

Chinese Office Action dated May 23, 2013 issued in corresponding Chinese Application No. 200980139169.2.

(Continued)

*Primary Examiner* — Joseph Waks
(74) *Attorney, Agent, or Firm* — Sughrue Mion, PLLC

(57) ABSTRACT

A nacelle cooling system of a wind turbine has cooling blocks which are arranged in order to respectively surround one or more heating devices installed inside a nacelle, a passage pipe line which is connected to the cooling blocks for coolant to flow, a primary heat exchanger which is connected to the passage pipe line and arranged on the outer lateral surface of the nacelle so as to seal the nacelle from outside, and a secondary heat exchanger which is capable of discharging heat generated inside the nacelle into outside the nacelle and constructed to seal the nacelle from outside.

4 Claims, 3 Drawing Sheets

(56) References Cited

U.S. PATENT DOCUMENTS

| | | | |
|---|---|---|---|
| 2005/0006905 A1* | 1/2005 | Rurup | 290/55 |
| 2008/0307817 A1* | 12/2008 | Roesner et al. | 62/259.2 |
| 2009/0200114 A1* | 8/2009 | Bagepalli et al. | 184/6.22 |
| 2010/0008776 A1* | 1/2010 | Larsen et al. | 416/39 |
| 2010/0034653 A1* | 2/2010 | Frokjaer | 416/39 |

FOREIGN PATENT DOCUMENTS

| | | |
|---|---|---|
| EP | 1921311 | 5/2008 |
| JP | 2003-504562 A | 2/2003 |
| JP | 2004353671 | 12/2004 |
| JP | 2009-530541 A | 8/2009 |
| JP | 2009-531579 A | 9/2009 |
| KR | 1020030042142 A | 5/2003 |
| KR | 20070037654 | 4/2007 |
| WO | 01/21956 A1 | 3/2001 |
| WO | 2007-110718 A2 | 10/2007 |

OTHER PUBLICATIONS

Japanese Office Action dated Nov. 2, 2012 issued in corresponding Japanese Application No. 2011-524914.

* cited by examiner

NACELLE COOLING SYSTEM FOR WIND TURBINE

TECHNICAL FIELD

The present invention relates, in general, to a nacelle cooling system for a wind turbine and, more particularly, to a nacelle cooling system for a wind turbine, which is capable of efficiently cooling a nacelle of the wind turbine equipped with a generator, a gearbox, an inverter, etc.

BACKGROUND ART

Generally, wind turbine systems are devices that covert kinetic energy from the wind into electric energy, and are typically classified into onshore wind turbine systems and offshore wind turbine systems, according to the condition of the environment in which the wind turbine system is installed.

FIG. 1 is a schematic view showing the structure of a general wind turbine system. The operation of the wind turbine system will be described in brief with reference to FIG. 1.

First, a tower 40 is set up on a solid ground 50 using a concrete structure or the like, and a nacelle 20 is seated on the tower 40. A gearbox 22, a generator 24, an inverter, a transformer, and others are provided in the nacelle 20. Blades 30 are coupled and secured to the gearbox 22 via a hub and a main shaft. The blades 30, which are rotated at low speed by the wind, generate kinetic energy of high speed of 1500 rpm or more via the gearbox 22, and the generator 24 converts the kinetic energy into electric energy. Electricity produced by the generator 24 is rectified by the inverter and then is transmitted.

The above regular conversion of energy in wind power generation causes a loss in the form of heat. The energy may be lost when the generator converts kinetic energy into electric energy, and may be lost by gear friction in the gearbox that is a driving line. Further, heat caused by the loss of energy may be generated in rectifying devices such as the inverter or the transformer.

If additional heat loss occurs in a power cable, a control cabinet, and a power supply for coupling respective devices to each other in the nacelle, heat loss is further increased undesirably.

Among the existing onshore wind turbine systems, in the case of generating a small capacity of electricity and thus generating a smaller amount of heat in the nacelle, the inside of the generator may be cooled by introducing external air into the nacelle. Meanwhile, as for the offshore wind turbine systems, in the case of using the generator, the gearbox, the inverter, etc. in a coastal environment, they may be damaged by corrosion because the external air contains salt.

DISCLOSURE

Technical Problem

Accordingly, the present invention has been made keeping in mind the above problems occurring in the prior art, and an object of the present invention is to provide a nacelle cooling system for a wind turbine, which is efficiently constructed to cool air in a nacelle with the nacelle being sealed from the outside in a wind turbine system used in a coastal environment, thus protecting the nacelle from salt and increasing the efficiency of the wind turbine system.

Technical Solution

In order to accomplish the above object, the present invention provides a nacelle cooling system for a wind turbine, including cooling blocks placed, respectively, to surround one or more heat generating devices which are provided in the nacelle, a passage pipe coupled to the cooling blocks so that coolant flows through the passage pipe, a primary heat exchanger coupled to the passage pipe and disposed on an outer surface or a rear end of the nacelle, and a secondary heat exchanger absorbing heat generated in the nacelle and discharging the heat to an outside of the nacelle, wherein the primary heat exchanger and the secondary heat exchanger are constructed to seal the nacelle from the outside.

The heat generating devices may be a generator, a gearbox, and an inverter.

The primary heat exchanger may perform a heat exchange process between the coolant flowing through the passage pipe and air.

Further, the secondary heat exchanger may include a duct, a heat generating member, and a heat transfer medium, the heat transfer medium discharging internal heat of the nacelle to the outside using a refrigerant which is contained therein.

The heat transfer medium may be a heat pipe.

The secondary heat exchanger may further include a fan on an end of the duct, with the fan forcibly introducing air into the duct.

A channel may be formed in each cooling block so that coolant flows through the channel. The channel may be continuously arranged in a zigzag fashion.

Advantageous Effects

According to the present invention, a nacelle cooling system for a wind turbine completely seals main parts in a nacelle from external salt when the nacelle of the wind turbine is operated in a coastal environment, thus preventing the performance of the main parts of the wind turbine from being lowered by corrosion.

Further, according to the present invention, devices generating a larger amount of heat in a nacelle are integrally cooled in a water-cooling manner, and other devices generating a smaller amount of heat are cooled in an air-cooling manner, so that efficient cooling is realized.

DESCRIPTION OF REFERENCE CHARACTERS OF IMPORTANT PARTS

Figure 1:
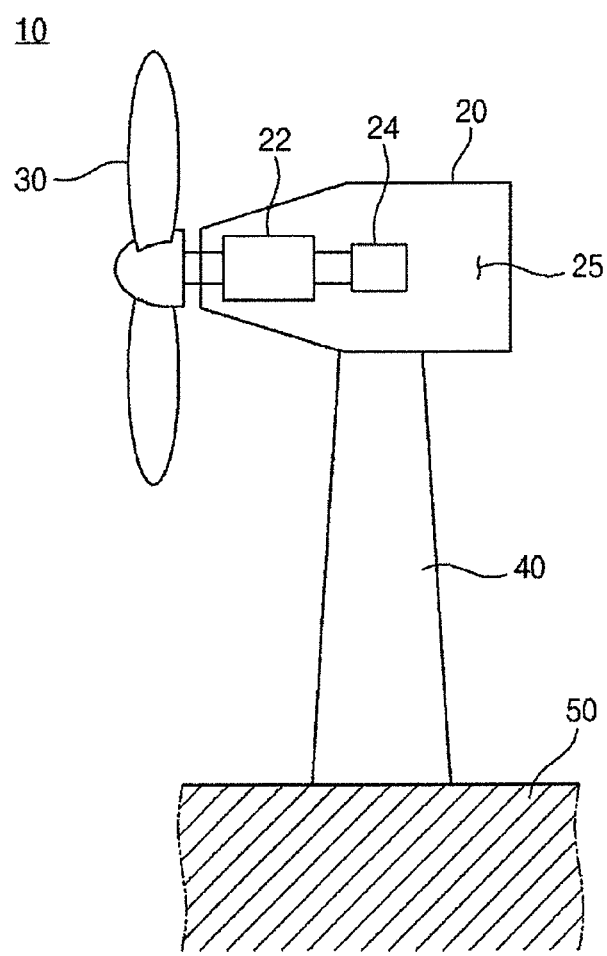
FIG. 1 is a schematic view showing the structure of a general wind turbine.

100: nacelle cooling system of wind turbine
101: tower
102: blade 104: hub
106: main shaft
110: nacelle
130: generator
150: secondary heat exchanger
152: heat transfer medium
153,156: blowing fan
160: passage pipe
170: cooling block
104: hub 108: control cabinet
120: gearbox
140: inverter
150: secondary heat exchanger
152: heat transfer medium
157: heat generating member
162: primary heat exchanger
180: controller Best Mode The above and other objects, features and advantages of the present invention will be more clearly understood from the following detailed description taken in conjunction with the accompanying drawings. Hereinafter, a nacelle cooling system for a wind turbine according to the embodiment of the present invention will be described in detail with reference to the accompanying drawings.

Figure 2:
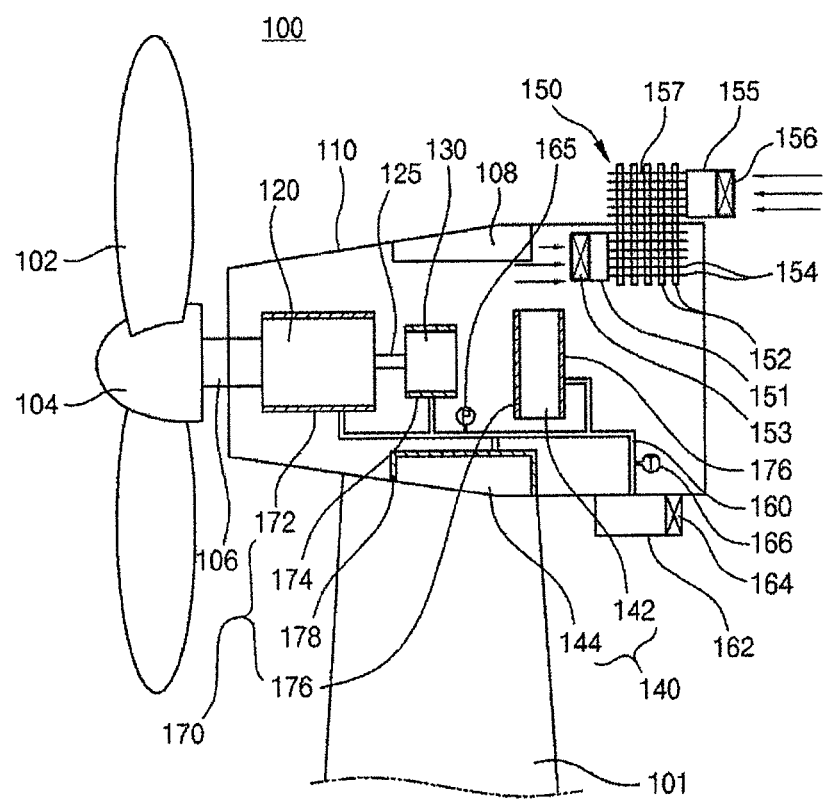
FIG. 2 is a view showing the construction of a nacelle cooling system for a wind turbine according to the present invention.
Figure 3:
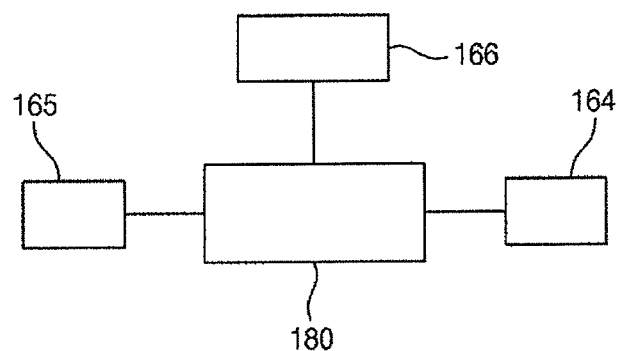
FIG. 3 is a block diagram showing the relationship between a controller, a temperature sensor, a blowing fan, and a pressure gauge.

FIG. 2 is a view showing the construction of a nacelle cooling system for a wind turbine according to the present invention, and FIG. 3 is a block diagram showing the relationship between a controller, a temperature sensor, a blowing fan, and a pressure gauge.

The nacelle cooling system for the wind turbine according to an embodiment of the present invention will be described below with reference to FIGS. 2 and 3.

The wind turbine 100 includes a tower 101, a nacelle 110, and blades 102. The nacelle 110 is seated on the top of the tower 101 to be secured thereto. The tower 101 may be fabricated in the form of a hollow steel structure, and may be built high by stacking up cylindrical members in several stages using a crane. Each blade 102 is coupled to a gearbox 120 in the nacelle 110 to convert kinetic energy generated by the blade 102 into electric energy.

An end of each blade 102 is inserted into the hub 104 to couple the blade 102 to the hub 104. The hub 104 is coupled to a main shaft 106. The main shaft 106 is rotatably fastened to the gearbox 120 in the nacelle 110, so that a coupling structure of the blade 102 with the gearbox 120 is completed.

Next, the nacelle cooling system for the wind turbine will be described. The nacelle 110 includes the gearbox 120, a generator 130, an inverter 140, and a control cabinet 108. The gearbox 120 transmits high-speed rotational kinetic energy through a power transmission shaft 125 to the generator 130. The generator 130 has therein a stator (not shown) and a rotor (not shown) coupled to the power transmission shaft 125, and generates electricity when the rotor rotates around the stator at high speed. The inverter 140 functions to remove impure noises from electric energy induced in the generator 130.

A cooling block 172 is provided to surround the outer surface of the gearbox 120. A channel (not shown) is formed in the cooling block 172 so that coolant flows through the channel. The channel may be continuously arranged in a zigzag fashion. In a similar manner to the gearbox 120, the generator 130 and the inverter 140 may be also provided with cooling blocks 174, 176, and 178. The cooling blocks 170 have channels to permit coolant to flow through them. The channels may be continuously arranged in a zigzag fashion to enhance cooling efficiency. The cooling block 172 is preferably made of a metallic material possessing superior heat conductivity, because the cooling block 172 must absorb heat generated by heat generating devices and then discharge the heat to the coolant.

The cooling blocks 170 are coupled to a passage pipe 160 in such a way as to communicate therewith. The passage pipe 160 moves the coolant absorbing heat from each cooling block 170 to a primary heat exchanger 162, so that a heat exchange process is performed. Preferably, the passage pipe 160 is made of a heat insulating material so as to prevent heat from being transferred to the inside of the nacelle 110 while the coolant flows in the passage pipe 160. It is preferable that the coolant be water in terms of cost and cooling effect. However, in order to enhance cooling efficiency, oil or gas may also be used as the coolant.

A pressure gauge 165 and a valve (not shown) may be installed at the passage pipe 160. The pressure gauge 165 senses the pressure of the coolant which flows in the passage pipe 160, and transmits the pressure to a controller 180 which is electrically connected thereto. The controller 180 selectively opens or closes the valve, thus preventing excessive pressure from being applied to the passage pipe 160.

The primary heat exchanger 162 is provided on the outer surface or rear end of the nacelle 110, and a first blowing fan 164 is mounted on an end of the primary heat exchanger 162 to permit the inflow of air. The primary heat exchanger 162 is provided on the outside of the nacelle 110, thus enhancing the space utilization of the nacelle 110, and preventing unnecessary waste heat generated by the heat exchange process from being transferred to the inside of the nacelle 110.

Herein, the cooling blocks 170 are coupled to one passage pipe 160 to perform the heat exchange process. However, an additional passage pipe may be provided in consideration of the heat capacity of each device and the internal space of the nacelle 110.

The nacelle cooling system is provided with a secondary heat exchanger 150 that may absorb heat generated in the nacelle 110 via the air and discharge the heat to the outside of the nacelle 110. The secondary heat exchanger 150 functions to cool air having temperature increased by parts which are not directly connected to generate power but generate heat, for example, the control cabinet 108, a power supply, a power cable, etc.

The secondary heat exchanger 150 includes ducts 151 and 155, heat generating members 154, and heat transfer mediums 152. The first duct 151 is provided inside the nacelle 110 to permit the inflow of hot air, and a second blowing fan 153 serves to forcibly introduce air into the first duct 151. Meanwhile, the second duct 155 is provided outside the nacelle 110 to permit the inflow of cooling air, and a third blowing fan 156 serves to forcibly introduce cooling air into the second duct 155.

The heat generating members 154 may be provided on an end of each of the ducts 151 and 155 in such a way as to be spaced apart from each other at predetermined intervals and to be parallel to a direction in which air is introduced. The heat transfer mediums 152 are arranged at predetermined intervals in such a way as to cross the heat generating members 154. Each heat transfer medium 152 may comprise a heat pipe.

Each heat transfer medium 152 contains a refrigerant, thus receiving the internal heat of the nacelle 110 from the first duct 151 and discharging the heat to the outside of the nacelle 110. That is, the heat generating members 154 located inside the nacelle 110 primarily absorb heat from high temperature air which is introduced into the first duct 151, and provide the heat to the heat transfer mediums 152. Thereafter, the heat transferred through the heat transfer mediums 152 is secondarily absorbed by the heat generating members 154 located outside the nacelle 110. In this state, the cooling operation is conducted by external air.

A temperature sensor 166, which is electrically connected to the controller 180, may be mounted to the passage pipe 160 coupled to the primary heat exchanger 162. The temperature sensor 166 senses the temperature of the coolant which flows through the passage pipe 160, and transmits the sensed result to the controller 180. The controller 180 compares a preset reference value with the sensed temperature data, thus controlling the rotating speed of the first blowing fan 164. In the case where the amount of generated heat is small in the above process, heat exchange capacity is reduced. Thus, the first blowing fan 164 is controlled to rotate at low speed, so that unnecessary noise and the wastage of power may be minimized. Similarly, temperature sensors may also be provided in the ducts 151 and 155 which are mounted to the secondary heat exchanger 150 to control the rotating speed of the blowing fans 153 and 156.

As such, the heat exchangers 150 and 162 have a cooling system which is isolated from the nacelle 110 having a sealing structure, thus preventing waste heat generated in the heat exchangers 150 and 162 from being transferred to the inside of the nacelle 110. Further, when the wind turbine is operated in the ocean, the performance of the main parts in the nacelle 110 can be prevented from being deteriorated by external salty air.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

Industrial Applicability

As described above, the present invention provides a nacelle cooling system for a wind turbine, which can be usefully applied to the wind turbine.

The invention claimed is:

1. A nacelle cooling system for a wind turbine including a nacelle which has a gearbox and a generator to perform wind power generation, a blade which is mechanically coupled to the gearbox, and a tower which is provided such that the nacelle is seated on a top thereof, the nacelle cooling system comprising:

cooling blocks placed, respectively, to surround one or more heat generating devices which are provided in the nacelle;

a passage pipe coupled to the cooling blocks so that coolant flows through the passage pipe;

a primary heat exchanger coupled to the passage pipe, and disposed on an outer surface or a rear end of the nacelle; and a secondary heat exchanger comprising a refrigerant circulating between an inside of the nacelle and an outside of the nacelle so as to discharge heat generated in the nacelle into the outside of the nacelle, wherein the primary heat exchanger and the secondary heat exchanger are constructed to seal the nacelle from the outside, wherein the heat generating devices comprise at least one selected from a group including a generator, a gearbox, and an inverter, and wherein the primary heat exchanger performs a heat exchange process between the coolant flowing through the passage pipe and external air.

2. The nacelle cooling system according to claim 1, wherein the secondary heat exchanger comprises a duct, a heat generating member, and a heat transfer medium, the heat transfer medium discharging internal heat of the nacelle to the outside using the refrigerant which is contained therein.

3. The nacelle cooling system according to claim 2, wherein the heat transfer medium comprises a heat pipe.

4. The nacelle cooling system according to claim 2, wherein the secondary heat exchanger further comprises a fan on an end of the duct, with the fan forcibly introducing air into the duct.

* * * * *